(12) United States Patent
Pruitt et al.

(10) Patent No.: US 8,984,851 B2
(45) Date of Patent: Mar. 24, 2015

(54) CHOPPER ATTACHMENT TO IMPROVE CONDITIONING OF BIO-MASS TYPE CROPS

(71) Applicant: AGCO Corporation, Duluth, GA (US)

(72) Inventors: Martin Pruitt, Hesston, KS (US); Brian Olander, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/354,965

(22) PCT Filed: Nov. 1, 2012

(86) PCT No.: PCT/US2012/062966
§ 371 (c)(1),
(2) Date: Apr. 29, 2014

(87) PCT Pub. No.: WO2013/067119
PCT Pub. Date: May 10, 2013

(65) Prior Publication Data
US 2014/0260169 A1 Sep. 18, 2014

Related U.S. Application Data

(60) Provisional application No. 61/553,999, filed on Nov. 1, 2011.

(51) Int. Cl.
*A01D 61/00* (2006.01)
*A01D 43/10* (2006.01)
(Continued)

(52) U.S. Cl.
CPC .............. *A01D 43/107* (2013.01); *A01D 43/10* (2013.01); *A01D 43/08* (2013.01); *A01D 34/015* (2013.01)
USPC ....................................... 56/16.4 R

(58) Field of Classification Search
CPC ....... A01D 43/10; A01D 82/00; A01D 82/02; Y10S 56/01
USPC ....... 56/16.4 R, 16.4 B, 16.4 C, 14.5, DIG. 1; 241/101.742
See application file for complete search history.

(56) References Cited

U.S. PATENT DOCUMENTS 3,397,525 A * 8/1968 Woodring ....................... 56/294
3,465,507 A * 9/1969 Fishaw ........................... 56/294

(Continued)

FOREIGN PATENT DOCUMENTS

EP     1982573 A1    10/2008

OTHER PUBLICATIONS

International Search Report for PCT Application US2012/062966, dated Feb. 22, 2013.

*Primary Examiner* — Árpád Fábián-Kovács

(57) ABSTRACT

A harvesting header includes a cutter bed having a plurality of cutting elements arranged transverse to the header and a crop chopping and conditioning region having a crop chopping device and a crop conditioning device. The crop chopping device is configured to chop crop cut by the cutter bed into smaller lengths and the crop conditioning device is configured to crimp the crop to aid in drying. The first chopping roller has a tubular, cylindrically-shaped body and a plurality of parallel knife-mounting lugs extending radially outward along substantially the full length of the body. A plurality of chopping knives are attached to the knife-mounting lugs and arranged around the body, each chopping knife having a length that is shorter than the length of the knife-mounting lug to which it is attached such that each chopping knife covers only a portion of the lateral length of the first chopping roller.

9 Claims, 3 Drawing Sheets

(51) Int. Cl.
*A01D 43/08* (2006.01)
*A01D 34/01* (2006.01)

(56) References Cited

U.S. PATENT DOCUMENTS

| | | | | |
|---|---|---|---|---|
| 3,604,188 | A | * | 9/1971 | Mott ................................ 56/294 |
| 4,299,078 | A | * | 11/1981 | Werner ........................... 56/14.5 |
| 4,422,358 | A | * | 12/1983 | Hull et al. ..................... 83/356.3 |
| 4,581,880 | A | * | 4/1986 | Klinner ........................... 56/364 |
| 4,594,842 | A | * | 6/1986 | Wolters et al. .................... 56/94 |
| 4,612,941 | A | * | 9/1986 | Kunde ........................... 460/112 |
| 4,843,804 | A | * | 7/1989 | Wellman ................... 56/16.4 C |
| 5,152,127 | A | * | 10/1992 | Koegel et al. .................. 56/14.1 |
| 5,272,861 | A | * | 12/1993 | Roynberg ........................ 56/504 |
| 5,482,508 | A | * | 1/1996 | Redekop et al. .............. 460/112 |
| 5,657,621 | A | * | 8/1997 | Mendes et al. ............. 56/16.4 D |
| 6,055,799 | A | * | 5/2000 | Savoie et al. .............. 56/16.4 R |
| 6,131,837 | A | * | 10/2000 | Wanner et al. ......... 241/101.742 |
| 6,158,201 | A | * | 12/2000 | Pruitt et al. ......................... 56/6 |
| 6,699,121 | B2 | * | 3/2004 | Bognar et al. ................. 460/112 |
| 6,996,961 | B2 | * | 2/2006 | Nickel et al. ............... 56/16.4 C |
| 7,404,761 | B2 | * | 7/2008 | Dow et al. ..................... 460/112 |
| 8,006,470 | B2 | | 8/2011 | Pruitt et al. |
| 8,221,203 | B1 | * | 7/2012 | Flickinger et al. ........... 460/112 |
| 2008/0120956 | A1 | * | 5/2008 | Gradoz et al. .................. 56/157 |

* cited by examiner

CHOPPER ATTACHMENT TO IMPROVE CONDITIONING OF BIO-MASS TYPE CROPS

BACKGROUND OF THE INVENTION

1. Field of Invention

This invention relates to the field of crop harvesting equipment and, more particularly, to apparatus for obtaining chopped and conditioned bio-mass crop materials within a windrow or swath.

2. Description of Related Art

Wide cut rotary harvesters are known to cut and condition crop material and deposit the conditioned crop material into a swath or windrow. Crop flow through the mower/conditioner is critical to proper, trouble-free harvesting operations. However, harvesting of tall, robust bio-mass type crops can be challenging. Bio-mass type crops sometimes consist of a cane-type crop that grows to great height and consists of heavy yields. Depending on the time of harvest, bio-mass type crops can become extremely tough and stringy in nature. Unless the cut and conditioned crop is fractured sufficiently, baler feeding and knotting issues may arise. It would be desirable to have a harvesting header better suited to chop and fracture this tall robust crop material.

OVERVIEW

In an example embodiment, the invention is directed to a harvesting header for use on a windrower operable to process crop material standing in a field. The header includes a cutter bed having a plurality of cutting elements arranged transverse to the header. The header also has a crop chopping and conditioning region having a crop chopping device and a crop conditioning device. The crop chopping device is configured to chop crop cut by the cutter bed into smaller lengths and the crop conditioning device is configured to crimp the crop to aid in drying. The crop chopping device includes a first chopping roller having a series of chopper knives mounted thereon and a second chopping roller configured to interact with the first chopping roller to chop the crop as it passes between the first and second chopping rollers. The first and second chopping rollers are arranged in a stacked relationship for rotation about respective, vertically spaced transverse axes, with the first chopping roller being driven in a first direction and the second chopping roller being driven in an opposite direction. The second chopping roller has a tubular, cylindrically-shaped body and a plurality of parallel lugs extending radially outward along the length of the body. The first chopping roller has a tubular, cylindrically-shaped body and a plurality of parallel knife-mounting lugs extending radially outward along substantially the full length of the body. A plurality of chopping knives are attached to the knife-mounting lugs and arranged around the body, each chopping knife having a length that is shorter than the length of the knife-mounting lug to which it is attached such that each chopping knife covers only a portion of the lateral length of the first chopping roller.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "upper" and "lower", are made as viewed from the front of the harvester looking rearwardly.

Figure 1:
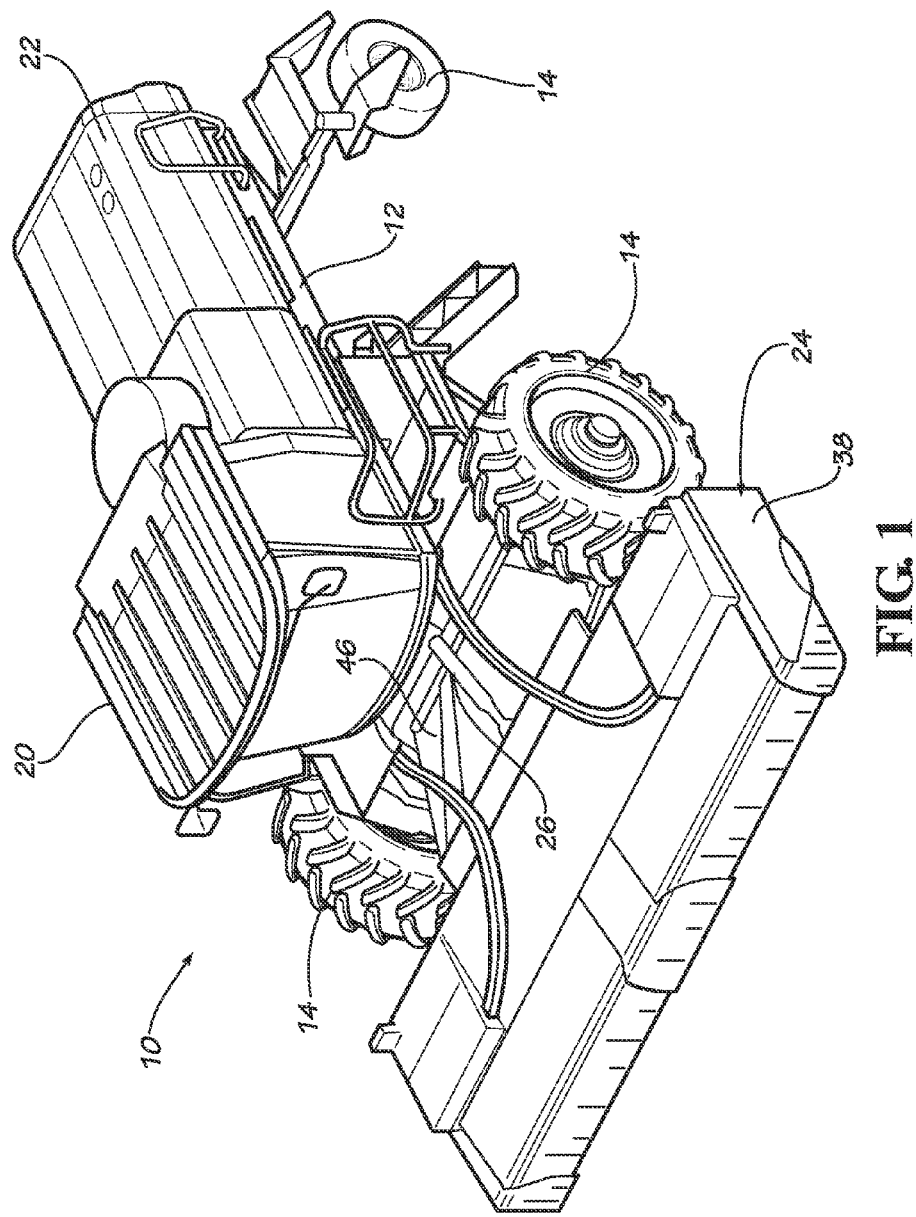
FIG. 1 is a perspective view of an example embodiment of a self-propelled windrower that may employ a header arrangement in accordance with the present invention.

Turning to the figures, FIG. 1 shows a harvester in the form of a self-propelled windrower 10 operable to mow and collect standing crop in the field, condition the cut material as it moves through the machine to improve its drying characteristics, and then return the conditioned material to the field in a windrow or swath. The windrower 10 may include a chassis or frame 12 supported by wheels 14 for movement across a field to be harvested. The frame 12 carries a cab 20, within which an operator controls operation of the windrower 10, and a rearwardly spaced compartment 22 housing a power source (not shown) such as an internal combustion engine. A harvesting header 24 is supported on the front of the frame 12 in a manner understood by those skilled in the art.

The header 24 may be similar to that disclosed in U.S. Pat. No. 6,158,201 entitled "Rotary Mower Conditioner Having Improved Crop Flow," U.S. Pat. No. 8,006,470 entitled "Crop Harvester Having Metal Conditioner Rolls with Herringbone Rib Pattern", and U.S. Patent Publication 2011/0146219 entitled "Wide Cut Rotary Harvester Having Helper Roll with Auger Flighting" all of which are assigned to the assignee of the present invention and hereby incorporated by reference in their entirety. The header 24 may be configured as a modular unit and consequently may be disconnected for removal from the frame 12. Accordingly, the frame 12 is not dedicated only to those harvesting operations provided by the header 24, but may carry other modular header designed to perform different harvesting operations. Similarly, the header 24 may be removed from the frame 12 and installed on other variously constructed mobile frames, such as a pull-type implement. In this respect, it will be appreciated that the principles of the present invention are equally applicable to pull-type harvesting machines and machines dedicated only to mowing and conditioning crop.

Figure 2:
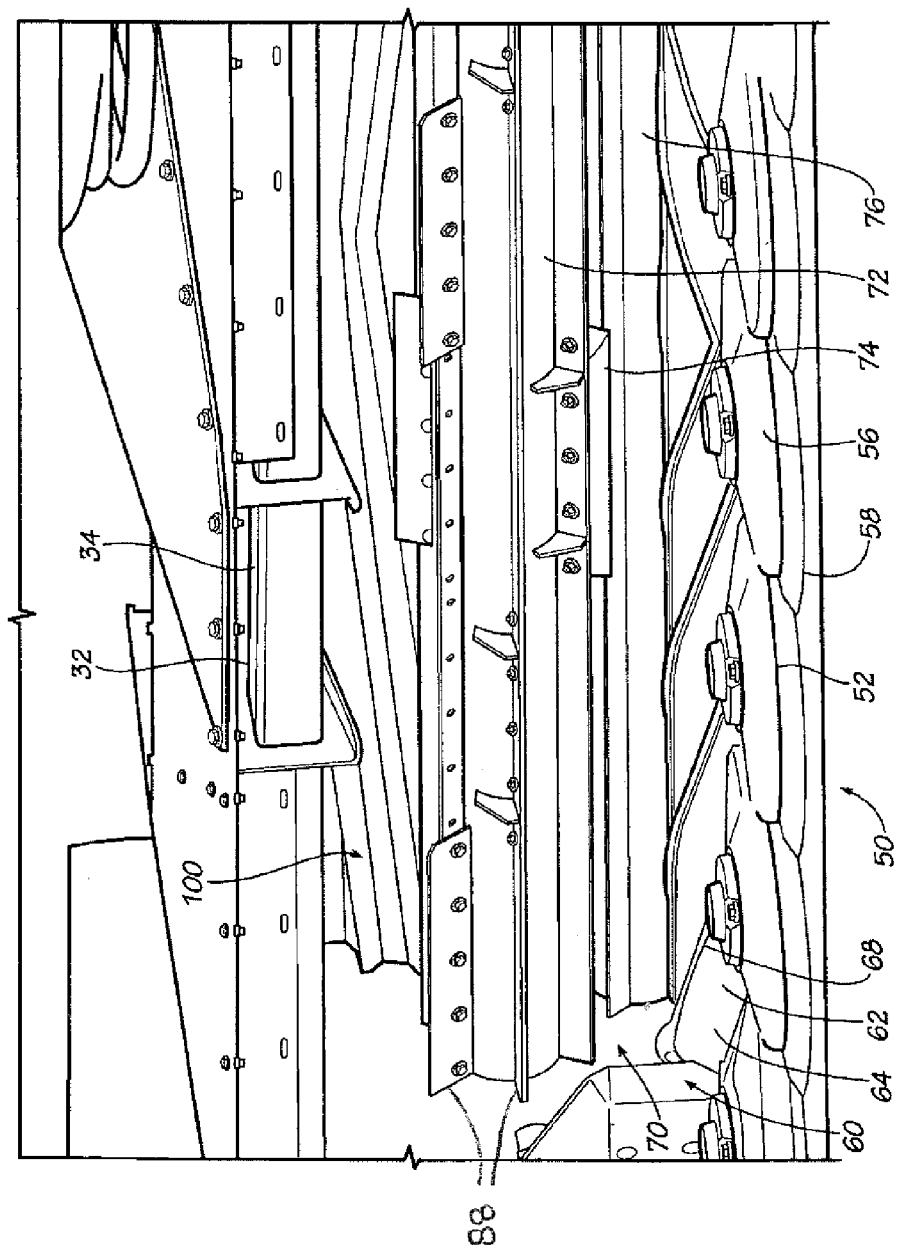
FIG. 2 is an enlarged front prospective view of a portion of an example embodiment of the header of FIG. 1 according to one embodiment of the invention.
Figure 3:
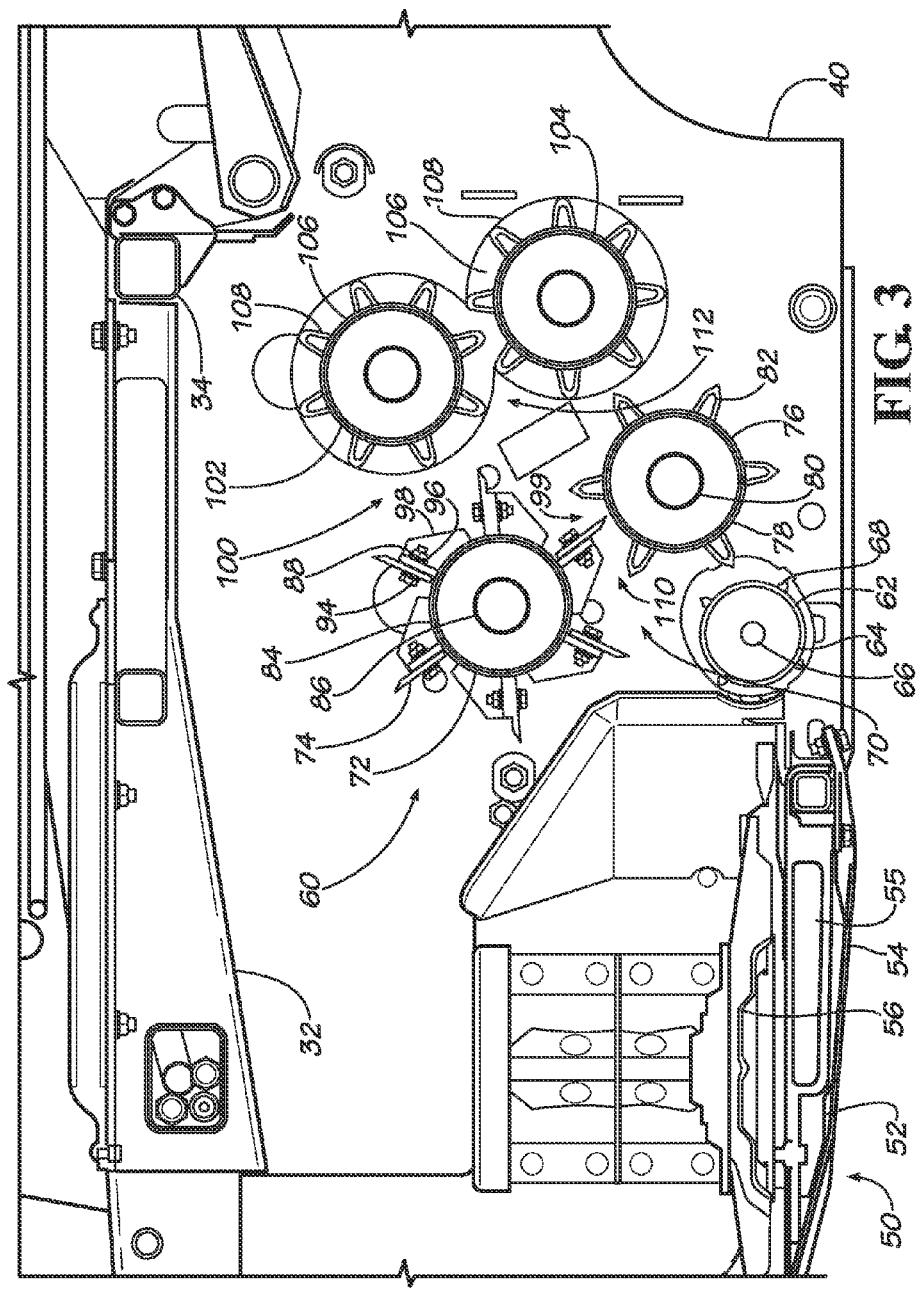
FIG. 3 is a side cutaway view of the header of FIG. 2

Turning also now to FIGS. 2 and 3, the header may have a generally open, box-like framework 32 that includes tubular cross beams 34 supported at opposite ends by side plates 38 (FIG. 1) to project rearwardly therefrom. Shield supports 40 converge rearwardly and support windrow forming shields, generally denoted by the reference numeral 46 in FIG. 1 forming a discharge opening through which cut crop passes as it moves rearwardly in the header 24.

A laterally extending crop cutting assembly in the form of a low profile, rotary style cutter bed 50 is located adjacent the front of the header framework 32 for severing crop from the ground as the harvester 10 moves across a field. The illustrated cutter bed 50 includes a plurality, for example ten, rotary cutters 52 in series spaced across the path of travel of the harvester 10 and each being rotatable about its own upright axis. A larger or smaller number of cutters 52 could be provided. However, one skilled in the art will understand that a sickle type cutter bed could also be used without departing from the scope of the invention. The cutters 52 are rotatably supported on an elongated, flat gear case 54 extending the full length of the cutter bed 50. The gear case 54 may contain a train of flat spur gears 55 that are operably engaged with one another and thus serve to distribute driving power between one another, although other forms of power distribution means may be used within the case 54 (e.g., shafts and bevel gears, belts and pulleys, or chains and sprockets). It will be appreciated that the cutters 52 may include a generally elliptical, metal knife carrier 56, and a pair of free swinging knives 58 at opposite ends of the carrier 56, as well understood by those of ordinary skill in the art and need not be discussed further herein.

Crop material cut by the cutter bed 50 is directed rearward to a crop chopping and conditioning region 60. A helper roll 62 may be provided for urging crop material cut by the cutter bed 50 laterally inward and rearward toward the crop chopping and conditioning region 60. The illustrated helper roll 62 may comprise a tubular, cylindrically-shaped body 64 carried by a pair of stub shafts 66 projecting from the ends of the body 64 and in one embodiment may be constructed and arranged similar to that set forth in the '201 patent. As best seen in FIG. 3, the helper roll 62 may include helical ribs 68, each extending along the length of the body 64 and having opposite inclination on either side of the midpoint of the helper roll 62. The body 64 and ribs 68 are desirably formed of metal, and the ribs 68 comprise cylindrical rods welded to the body 64, although other suitable materials and means for attaching the ribs 68 to the body 64 may be used. The ribs 68 enhance the aggressiveness of the roller periphery to further influence movement of crop material between the cutter bed 50 and crop chopping and conditioning region 60.

The crop chopping and conditioning region 60 includes a crop chopping device 70 and a crop conditioning device 100. The crop chopping device 70 is configured to chop the crop into smaller lengths. The crop conditioning device 100 is configured to crimp the crop to aid in drying as is known in the art. In the illustrated embodiment, the crop chopping device 70 receives the crop cut by the cutter bed 50 from the helper roll 62 and then passes the crop to the crop conditioning device 100. However, the locations of the crop chopping device 70 and the crop conditioning device 100 may be reversed such that the crop cut by the cutter bed 50 passes first to the crop conditioning device 100 and then to the crop chopping device 70 without departing from the scope of the invention.

In the illustrated embodiment, the crop chopping device 70 includes an upper chopping roller 72 having a series of chopper knives 74 mounted thereon and a lower chopping roller 76 configured to interact with the upper chopping roller 72 to chop the crop as it passes between the upper and lower chopping rollers 72, 76. In the example embodiment, the upper and lower chopping rollers 72, 76 are arranged in a stacked relationship for rotation about respective, vertically spaced transverse axes, with the upper chopping roller 72 being driven in a counterclockwise direction and the lower chopping roller 76 being driven in a clockwise direction as viewed in FIG. 3. However, one skilled in the art will understand that the chopping roller having the chopping knives 74 may also be positioned beneath the other chopping roller or that both chopping rollers 72, 76 may have chopper knives 74 without departing from the scope of the invention.

The lower chopping roller 76 has a tubular, cylindrically-shaped body 78 carried by stub shafts 80 projecting from the ends of the body 78. The lower chopping roller 76 has a plurality of parallel lugs 82 extending radially outward along the length of the body 78. In the illustrated embodiment, there are six lugs 82 extending from the body 78. However, one skilled in the art will understand that more or fewer lugs 82 may be used. The body 78 and lugs 82 are desirably formed of metal, with the lugs welded to the body, although other suitable materials and means for attaching the lugs 82 to the body 78 may be used.

The upper chopping roller 72 also has a tubular, cylindrically-shaped body 84 carried by stub shafts 86 projecting from the ends of the body 84. A plurality of parallel knife-mounting lugs 88 extends radially outward along substantially the full length of the body 84. Desirably, there are the same number of knife-mounting lugs 88 extending from the upper chopping roller 72 as the number of lugs 82 extending from the lower chopping roller 76. The body 84 and knife-mounting lugs 88 are desirably formed of metal, with the lugs 88 welded to the body 84, although other suitable materials and means for attaching the knife-mounting lugs 88 to the body 84 may be used.

The chopping knives 74 are attached to the knife-mounting lugs 88 and arranged around the tubular body 84. Each chopping knife 74 has a length that is shorter than the length of the knife-mounting lugs 88 such that each chopping knife 74 covers only a portion of the lateral length of the upper chopping roller 72. As best seen in FIG. 2, each chopping knife 74 mounted on one of the knife-mounting lugs 88 is offset laterally from chopping knives 74 mounted on adjacent knife-mounting lugs 88 located around the circumference of the tubular body 84. Desirably, chopping knives 74 on different knife-mounting lugs 88 around the circumference of the tubular body 84 are arranged in a laterally abutting or overlapping arrangement to provide chopping coverage over the entire length of the upper chopping roller 72. Thus, for each rotation of the upper chopping roller 72, crop passing between the chopping rollers 72, 76 at any lateral position along the upper chopping roller 72 will be chopped at least one time by a chopping knife 74 on the upper chopping roller 72.

In one embodiment, the chopping knives 74 are arranged in a helical step pattern such that a chopping knife 74 on one knife-mounting lug 88 has a chopping knife 74 in a laterally abutting or slightly overlapping position in a first direction on the adjacent knife-mounting lug 88 immediately clockwise, and a chopping knife 74 in a laterally abutting or slightly overlapping position in the opposite direction on the adjacent knife-mounting lug 88 immediately counter-clockwise. In one desirably embodiment, the upper chopping roller 72 is configured such that each knife-mounting lug 88 has a corresponding knife-mounting lug 88 in a diametrically opposed position on the body 84 such that the corresponding knife-mounting lugs 88 are positioned in substantially the same plane. Corresponding knife-mounting lugs 88 have chopping knives 74 spaced uniformly in substantially the same lateral position along the length of the upper chopping roller 72 to provide a more balanced chopping action as the upper chopping roller 72 rotates and interacts with the lower chopping roller 76.

In the illustrated embodiment, the chopping knives 74 are bolted to the knife-mounting lugs 88 with suitable bolts 94 and nuts 96. However, other means for attaching the chopping knives 74 may be used using sound engineering judgment. Gussets 98 preferably are attached between the knife-mounting lugs 88 and the body 84 to provide structural support and discourage the lugs 88 from being bent backwards during chopping action. Desirably, there is at least one gusset 98 supporting the knife-mounting lug 88 where each chopping knife 74 is attached to the knife-mounting lug 88. The lower chopping roller 76 is configured to engage the chopping knives 74 of the upper chopping roller 72 in valleys 99 between the lugs 82 of the lower chopping roller 76. The chopping knives 74 can be set in close proximity of the body 78 of the lower chopping roller 76 to encourage a complete chop of crop passing between the upper and lower chopping rollers 72, 76. The timing between the upper and lower chopping rollers 72, 76 can be adjusted to vary the amount of support the lugs 82 of the lower chopping roller 76 present on chopping the crop. The knife-mounting lugs 88 provide a means of mounting the chopper knives 74, but also provide a means to feed crop through the crop chopping device 70 and into a crop conditioning device 100. The upper and lower chopping rollers 72, 76 are desirably yieldably biased toward one another by tension means not illustrated so as to maintain a degree of yieldable intermeshing of the rolls depending upon the volume of crop materials passing therebetween.

In one embodiment, the crop conditioning device 100 includes a pair of laterally extending crop conditioning rolls 102, 104. The crop conditioning 102, 104 rolls are desirably rotatably mounted and span the header 10. The crop conditioning rolls 102, 104 comprise cylindrical metal bodies 106 having intermeshing, metal ribs 108 extending along the length of the bodies 106, although other conditioning roll designs (e.g., rubber-coated rolls) may be utilized. The conditioning rolls 102, 104 may be constructed and arranged similar to that set forth in the '201 or the '470 patents. In the example embodiment, the conditioning rolls 102, 104 are arranged in a stacked relationship for rotation about respective, vertically spaced transverse axes, with the upper roll 102 being driven in a counterclockwise direction and the lower roll 104 being driven in a clockwise direction as viewed in FIG. 3. The rolls 102, 104 are desirably yieldably biased toward one another and receive chopped crop from the crop chopping device 70 and propels the chopped and conditioned crop rearwardly toward the windrow forming shields 46. The crop chopping rollers 72, 76 and crop conditioning rolls 102, 104 are drivingly connected to drive motors (not shown) through any known transmission and U-joint assemblies at opposite ends thereof as understood by one skilled in the art.

The crop upper and lower chopping rollers 72, 76 define a nip 110 therebetween through which severed crop materials pass from the cutter bed 50 and propels the same rearwardly toward the crop conditioning device 100 as they are being chopped. The nip 110 is spaced upwardly and rearwardly from the cutter bed 50. It may also be said that the nip 110 is spaced upwardly and rearwardly from the generally planar cutting zone defined by the rotary bed 50. Likewise, crop conditioner rolls 102, 104 define a nip 112 for receiving crop materials from crop chopping rollers 72, 76 and conditioning such crop materials before projecting them rearwardly for deposit on the ground in the form of a windrow or swath as understood by those skilled in the art.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A harvesting header for use on a windrower operable to process crop material standing in a field, the header comprising:

a cutter bed comprising a plurality of cutting elements, said plurality of cutting elements arranged transverse to the header; and a crop chopping and conditioning region comprising a crop chopping device and a crop conditioning device, wherein the crop chopping device is configured to chop crop cut by the cutter bed into smaller lengths and the crop conditioning device is configured to crimp the crop to aid in drying, the crop chopping device includes a first chopping roller having a plurality of chopper knives mounted thereon and a second chopping roller configured to interact with the first chopping roller to chop the crop as it passes between the first and second chopping rollers, the first and second chopping rollers being arranged in a stacked relationship for rotation about respective, vertically spaced transverse axes, with the first chopping roller being driven in a first direction and the second chopping roller being driven in an opposite direction, wherein the first chopping roller has a tubular, cylindrically-shaped body and a plurality of parallel knife-mounting lugs extending radially outward along substantially the full length of the body, and the plurality of chopping knives are attached to the knife-mounting lugs and arranged around the body, and wherein each chopping knife has a length that is shorter than the length of the knife-mounting lug to which it is attached such that each chopping knife covers only a portion of the lateral length of the first chopping roller, and wherein the chopping knives are each mounted on one of the knife-mounting lugs and offset laterally from the chopping knives mounted on adjacent knife-mounting lugs around the circumference of the tubular body and arranged along the tubular body on the knife-mounting lugs in at least an abutting manner to provide chopping coverage over the entire lateral length of the first chopping roller between chopping knives positioned on one end of the first chopping roller and chopping knives positioned on an opposite end of the first chopping roller.

2. The header of claim 1 wherein the second chopping roller has a tubular, cylindrically-shaped body and a plurality of parallel lugs extending radially outward along the length of the body.

3. The header of claim 1 wherein the chopping knives are arranged in a helical step pattern such that a chopping knife on one knife-mounting lug has a chopping knife in a position either laterally abutting or slightly overlapping in a first direction on the adjacent knife-mounting lug immediately clockwise, and a chopping knife in a position laterally either abutting or slightly overlapping in the opposite direction on the adjacent knife-mounting lug immediately counter-clockwise.

4. The header of claim 1 wherein the first chopping roller is configured such that each knife-mounting lug has a corresponding knife-mounting lug in a diametrically opposed position on the body such that the corresponding knife-mounting lugs are in substantially the same plane.

5. The header of claim 1 wherein at least one gusset supports the knife-mounting lug where each chopping knife is attached to the knife-mounting lug.

6. The header of claim 1 wherein the knife-mounting lugs feed crop through the crop chopping device and into a crop conditioning device.

7. The header of claim 1 wherein the crop conditioning device is positioned closer to the cutter bed than the crop chopping device such that the crop cut by the cutter bed passes first to the crop conditioning device and then to the crop chopping device.

8. The header of claim 1 wherein the crop chopping device is positioned closer to the cutter bed than the crop conditioning device such that the crop cut by the cutter bed passes first to the crop chopping device and then to the crop conditioning device.

9. The header of claim 1 further comprising a helper roll urging crop material cut by the cutter bed laterally inward and rearward toward the crop chopping and conditioning region.

* * * * *